United States Patent

[11] 3,624,637

[72] Inventor John W. Irwin
Longmont, Colo.
[21] Appl. No. 32,883
[22] Filed Apr. 29, 1970
[45] Patented Nov. 30, 1971
[73] Assignee International Business Machines Corporation
Armonk, N.Y.

[54] DIGITAL CODE TO DIGITAL CODE CONVERSIONS
13 Claims, 3 Drawing Figs.

[52] U.S. Cl. .......... 340/347 DD, 235/155
[51] Int. Cl. .......... H04l 3/00
[50] Field of Search .......... 235/155; 340/347

[56] References Cited

UNITED STATES PATENTS

| | | | |
|---|---|---|---|
| 3,526,759 | 9/1970 | Clapper .......... | 235/155 |
| 3,506,815 | 4/1970 | Stone .......... | 235/155 |
| 3,293,416 | 12/1966 | Chisholm .......... | 340/347 |

*Primary Examiner*—Thomas A. Robinson
*Assistant Examiner*—Jeremiah Glassman
*Attorneys*—Hanifin and Jancin and Herbert F. Somermeyer

ABSTRACT: Correlation between digit positions of code groups of the two digital codes having different code group size, enables conversion with minimum logic. One of the digit positions in each of the code groups may have a one-for-one relationship with the corresponding digit position in another code group. The larger code group may have a set of digit positions having unique relationships to a like number of digit positions in the smaller code group. Such relationships effect predetermined permutation characteristics within each of the code groups. The larger code group may be a run-length limited code. The number of digit positions in the set of related digit positions is equal to the limit of the run length. The position of a digit fed directly through a converter without conversion is preferably located adjacent the set of related digit positions. In a specific form of the invention, conversions are made between a four-bit binary code and five-bit run-length-limited code. The conversion from a small code group to a larger code group is effected by adding binary 1's during the conversion process. In converting from a larger or second code group to a smaller or first code group, 1's are subtracted from the code representations.

FIG. 1
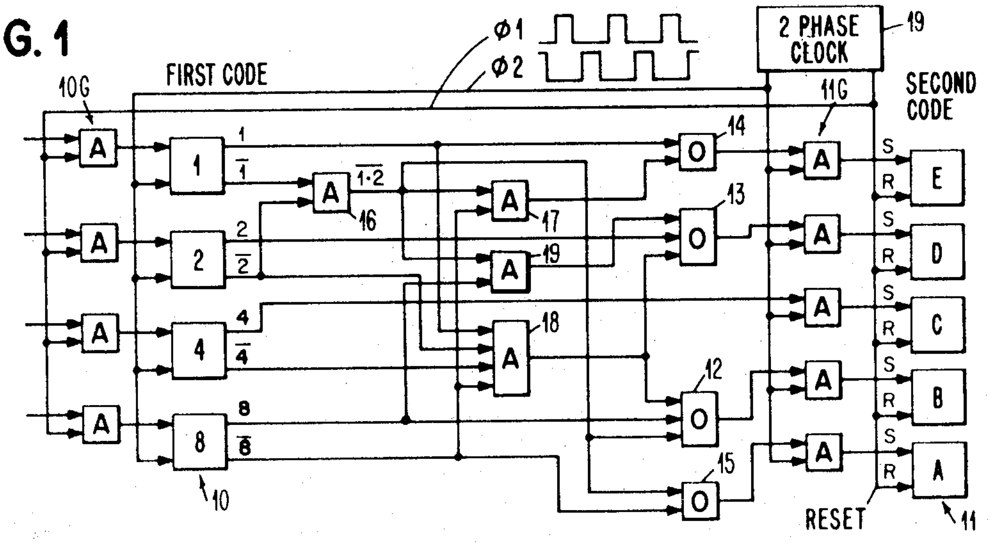
FIG. 3
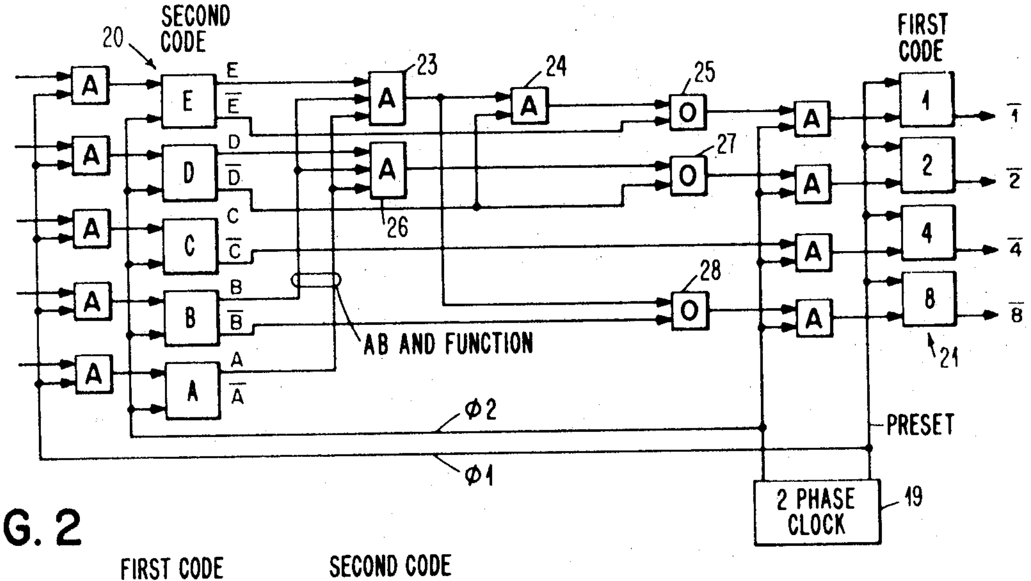
FIG. 2
| DECIMAL | FIRST CODE 8 | 4 | 2 | 1 | SECOND CODE A | B | C | D | E |
|---|---|---|---|---|---|---|---|---|---|
| 0 | 0 | 0 | 0 | 0 | X | X | 0 | 0 | X |
| 1 | 0 | 0 | 0 | 1 | X | X | 0 | X | 1 |
| 2 | 0 | 0 | 1 | 0 | X | 0 | 0 | 1 | 0 |
| 3 | 0 | 0 | 1 | 1 | X | 0 | 0 | 1 | 1 |
| 4 | 0 | 1 | 0 | 0 | X | X | 1 | 0 | X |
| 5 | 0 | 1 | 0 | 1 | X | 0 | 1 | 0 | 1 |
| 6 | 0 | 1 | 1 | 0 | X | 0 | 1 | 1 | 0 |
| 7 | 0 | 1 | 1 | 1 | X | 0 | 1 | 1 | 1 |
| 8 | 1 | 0 | 0 | 0 | X | 1 | 0 | X | 0 |
| 9 | 1 | 0 | 0 | 1 | 0 | 1 | 0 | 0 | 1 |
| 10 | 1 | 0 | 1 | 0 | 0 | 1 | 0 | 1 | 0 |
| 11 | 1 | 0 | 1 | 1 | 0 | 1 | 0 | 1 | 1 |
| 12 | 1 | 1 | 0 | 0 | X | 1 | 1 | X | 0 |
| 13 | 1 | 1 | 0 | 1 | 0 | 1 | 1 | 0 | 1 |
| 14 | 1 | 1 | 1 | 0 | 0 | 1 | 1 | 1 | 0 |
| 15 | 1 | 1 | 1 | 1 | 0 | 1 | 1 | 1 | 1 |
X'S ARE ADDED 1'S
INVENTOR
JOHN W. IRWIN
BY Hubert [signature]
ATTORNEY

DIGITAL CODE TO DIGITAL CODE CONVERSIONS

BACKGROUND OF THE INVENTION

The present invention relates to a digital-to-digital conversion.

In automatic digital machines it is quite common that various portions of systems incorporating such machines have different signal combinatorial groups representing data. A reason for this is that certain portions of digital systems may operate better with differing combinatorial groupings. Such is particularly true in the memory portions of automatic digital machines. For example, in moving magnetic media, bandwidth, self clocking and other requirements dictate a predetermined storage code to be used rather than the recording of straight binary coded signals. This requirement becomes particularly apparent at higher recording densities.

One of the problems in magnetic recording is that the bandwidth of the recording channel, i.e., the read and write circuits, should be limited such as to minimize peak shift, baseline shift and the like. In self-clocking systems, which are well known, the spacing between two successive flux transitions on the magnetic media should be kept to a predetermined minimum. To enhance this aspect of the system performance, storage codes have been used which limit the run length of O's, i.e., no transitions, to a small predetermined number as 4, 3 or 2. It has been previously taught that an increase in the number of bits per data character in a storage code over a binary code enables one to obtain a greater data storage density on a magnetic media while maintaining reliable data processing operations therewith.

When using such a storage code, it is necessary to convert signals between a binary code and the storage code and vice versa. Such conversions, if arbitrarily chosen, can greatly increase the cost of storage system or reduce its data throughput capacity. Also, in digital data communications systems it may be desirable to have similar codes for transmission purposes. The encoding and decoding or code conversions present the same basic cost and throughput problems as for data recording systems.

SUMMARY OF THE INVENTION

It is an object of the present invention to provide an efficient conversion between first and second digital codes with a minimum of logic decisions to be performed in a conversion in either direction.

A method of converting from one digital code to a second digital code, wherein signals from digit positions of an input code group are supplied directly to and are inserted into corresponding digit positions of an output code group. Further, combinations of signals in selected digit positions of the input code group are selectively combined and logically OR'd with the directly supplied signals to complete the output code group. One digit position in the input and output code groups are identical. When one of the codes is a run-length-limited code, that is a number of O's in a row is limited to a small predetermined number, such as 2; then the signal that is identical in both codes is displaced from one end of the code groups by a number of digit positions equal to the run-length limit.

Another feature of the conversion between digital codes is wherein one of the codes is a run-length-limited code, a group of digit positions equal to the run-length limit is selected from the both code groups as a special related set of digits. Selective decoding in a code conversion utilizes the set of digits for simplifying the logic in a digital-to-digital converter.

In a preferred form of the invention, conversions from a first code to a second code, wherein the second code has a greater number of digit positions than the first code, are by adding 1's to the combination of signals in the first code. In converting from the second code to the first code, it is preferred that 1's be deleted for generating a first code which is represented by the combination of signals in the second code. It is understood that the preferred modes of conversion can be utilized in converting between the first and second codes but not necessarily in the reverse direction, i.e., from the second to the first code, and still practice the present invention.

A code converter utilizing the teachings of the present invention has an input code means and an output code means. Interconnecting the input and output code means is a simple array of AND/OR logic functions with the OR logic functions receiving signals directly from the input means for transferring the input signals directly to the output code means. The signal states of the output code means has a direct correlation with the signal states of the input code means. Further, AND circuits are interconnected with the directly supplied 1's such that the signal states of the output code means digit positions are selectively altered in a logic additive or subtractive manner from the signal states of the input code means. When the conversion is from a code having a smaller number of digit positions to a code having a larger number of digit positions, the conversion is preferably additive, i.e., AND circuits generate a code having a greater number of digit positions with a limited number of valid code permutations such that 1's or active conditions are generated. In converting from a code having a larger number of digit positions to a code having a fewer number of digit positions, the signals representing 1's are selectively deleted, preferably using "negative" logic i.e., instead of setting a circuit to an active condition to represent a binary 1, the output means are initially set, then selectively reset to represent a binary 0.

The foregoing and other objects, features, and advantages of the invention will be apparent from the following more particular description of preferred embodiments of the invention, as illustrated in the accompanying drawings.

BRIEF DESCRIPTION OF THE DRAWING

FIG. 1 is a signal-flow logic diagram illustrating a converter constructed in accordance with the teaching of the present invention for converting from a first code a four digit position code group to a second run-length-limited code having a five digit position code group.

FIG. 2 is a truth table showing the conversion values between the first and second codes and is used in conjunction with FIGS. 1 and 3 to describe the teachings of the present invention.

FIG. 3 is a signal-flow logic diagram illustrating a converter for converting from a second code having a five digit position code group to the first code having a four digit position code group.

DETAILED DESCRIPTION

A digital-to-digital converter is shown in FIG. 1. The first code group input means 10 includes four bistable circuits labeled 1, 2, 4 and 8 each having true and complement outputs, together with input gating 10G. The complement output signals are indicated by the bar over the number. A set of five bistable circuits A–E with gating 11G constitute output code means 11 for momentarily holding second code groups representative of the permutations of the first code group. Bistable circuits A–E may be set/reset type of latches.

The timing of code signals being converted is first described. Two phase clock 19 supplied successive timing signals 01 and 02 to the input and output means. 01 signals gate data signals into means 10 via gating means 10G and simultaneously reset all latches in means 11 in preparation for the code conversion. As latches in means 10 are selectively set, the input code is converted with converted-code representing signals being presented to output means gating 11G. 02 of the clock gates the converted-code signals to latches A—E and simultaneously resets latches 1—8 in means 10. The converter is now ready to receive a new code group to be converted. The converted code group in means 11 is removed from latches A—E between 01 and 02 clock signals.

Upon insertion of a code into input means 10, signals are supplied through the illustrated logic conversion circuits to the second code or output means 11. The true output signals of all of the input bistable circuits in input means 10 are supplied directly to second code latches B–E. Latches B, D, and E respectively receive the true signals from the input means through OR-circuits 12, 13 and 14. Latch C is always set whenever input bistable circuit 4 is set. Accordingly, the signal in digit position C has a one-for-one correlation with the signal in digit position 4 of the input means. The complement signal from input means circuit 8 is supplied through OR-circuit 15 to set latch A in the output means. As will become apparent, this is important since the second code group is a run-length-limited type of code, that is, latches A and B quite often will have opposite signal states.

In addition to the directly fed-through signals described above, additional 1's are supplied in accordance with combinations of digits of the input means. The second code generated by the converter is a run-length-limited type, that is, the run-length of 0 s on a row is limited to 2. The reason for this arrangement is that in many recording systems, binary 1's are arbitrarily represented by a change of flux state on a magnetic media while O's are represented by no such flux state change.

FIG. 2 is the code conversion truth table for the exemplary first and second codes. In the tabular columns, under the second code, the 1's therein represent a one-for-one relationship with the binary 1's set forth in the first code. The O's also have a one-for-one relationship with the O's in the first code. The X in the second code represents added 1's to accomplish the run-length-limited permutation characteristics. These additional 1's are added to signals from the first code by AND-circuits 16, 17 and 18 together with interconnections with OR-circuits 12–15. The logic equations representing logic functions of circuits 12–18 are set forth below wherein + indicates a logic OR function, and an × indicates a logic AND function, while a bar over the number indicates a complement signal. That is, the bit position represented by the Arabic numeral is equal to a binary zero.

$$E=1+(\bar{8}\times\bar{2}\times\bar{1}) \qquad (1)$$
$$D=2+(8\times\bar{2}\times\bar{1})=(\bar{8}\times\bar{4}\times\bar{2}\times2) \qquad (2)$$
$$C=4 \qquad (3)$$
$$B=8+(\bar{2}\times\bar{1})(\bar{8}\times\bar{4}\times\bar{2}\times1) \qquad (4)$$
$$A=\bar{8}+(\bar{2}\times\bar{1}) \qquad (5)$$

The first terms immediately to the right of equal sign in the logic equations represent the direct fed-through signals from the first code in input means 10 to output means 11. The AND terms immediately to the right of the fed-through terms represent the operation of the three AND-circuits 17, 18, and 19. The term $(\bar{2}\times\bar{1})$ is common to equations (1), (2), (4) and (5). This term is derived from the set of digits in the first code having the above mentioned relationships to the second code permutations AND-circuit 16 supplies a $(\bar{2}\times\bar{1})$ signal to AND-circuits 17 and 19 (1) and (2) and to OR-circuits 12 and 15 for equations (4) and (5). Inspection of FIG. 1 shows how AND-circuits 17, 18 and 19 together with OR-circuits 12, 13, and 14 solve equations (1), (2), and (5) to generate second code digits A, B, D, and E, respectively. In comparing the first and second codes, the 1 digit position in the first code can be most favorably compared with the E digit position in the second code. Note that for every 1 appearing in the 1's column in the first code, there is a corresponding 1 in the E's column in the second code. Additionally, in order to meet the run-length-limit requirements of the second code, two additional 1's are added to the E column as indicated by the X's. In a similar manner, the 2's column corresponds to the D column; the 4's column to the C column, which is a one-for-one exchange; and the 8's column corresponds to the B column. The A column corresponds to $\bar{8}$ of the first code. Note that all of the signals in the A column of the second code are X's which indicates that it corresponds to being an extra digit position in a storage code over and above that provided in the first or data processing code.

In converting from second code to first code, the X's (extra 1's) must be removed. While a straight translation can be used to accomplish this removal, a minimal system is shown in FIG. 3.

Timing an operation of the FIG. 3 illustrated second code to first code converter is very similar to the FIG. 1 illustrated system. In FIG. 3, the 1's are subtracted from the second code group to generate a first code group having fewer digit positions. The conversion uses subtractive logic, that is, logic that deletes 1's from the input second code group. Initially all output means latches are set as opposed to resetting the output latches in FIG. 1.

The complement outputs of the second code input means 20 for positions B through E are transmitted directly to reset latches in the first code output means 21. Means 21 is conditioned for receiving the complements, i.e., the zeros from the second code group by being preset to the active condition, i.e., each latch in the first code output means 21 is set to represent a binary 1. Bistable circuits 1, 2, 4 and 8 in means 21 are selectively reset in accordance with the second code output thereby subtracting 1's from the first code group. Digits A and B of the second code group constitute a set of related digit positions equal to the run-length which is useful in minimizing conversion hardware. The true outputs of the A and B digit positions are combined in AND-circuits 23 and 26 to effectively provide an AB signal for selectively resetting digit latches 1 and 2 of output means 21. While a separate AND circuit may be provided, such is not required since AND-circuits 23 and 26 perform the AND function with other AND functions. The logic for resetting latch 1 in means 21 is set forth in the below equation:

$$\bar{1}=\bar{E}+(AB)D\bar{E} \quad (6)$$

AND-circuits 23 and 24 provide the second term of the above logic equation and supply a signal through OR-circuit 25 for selectively resetting 1 digit position for generating a $\bar{1}$ signal. It is remembered that $\bar{1}=0$ in the 1's digit position.

In a similar manner, the $\bar{2}$ signal is generated in accordance with the below logic equation:

$$\bar{2}=\bar{D}+(AB)D \quad (7)$$

AND-circuit 26 performs the AB AND function in combining A, B and D signals to solve the second term of the above logic equation. OR circuit 27 combines the two signals $\bar{D}$ and $(AB)D$ for selectively resetting bistable circuit 2 in means 21.

The bistable circuit 4 is reset whenever bistable circuit C is reset.

The remaining bistable circuit 8 in output means 21 is reset in accordance with the following equation:

$$\bar{8}=\bar{b}+ABE \quad (8)$$

The output signal $(AB)E$ from AND-circuit 23 is supplied directly to OR-circuit 28 for selectively resetting this latch.

Inspection of FIG. 2 shows that the just described logic equations and circuitry will eliminate all of the X's set forth in the second code column and will generate a corresponding first code groups.

Another interesting observation of the two conversion systems is that in going from a first code to the second code, three AND circuits and four OR circuits are used with an additive logic. In going from the second code to the first code, four AND functions (performed by three AND circuits) and three OR circuits are used in a subtractive logic arrangement. The small number of AND and OR circuits are respectively less than the number of digit positions in the small code group and the output means respectively. In logic circuits an AND circuit can be considered as a negative OR circuit and vice versa. Accordingly, the three AND and four OR circuit array of FIG. 1 is considered a positive conversion array. The four AND function, three OR circuit array of FIG. 3 is considered the logic negative of the FIG. 1 illustrated converter. The number of logic elements in both arrays are believed to be minimal. Also note that for all code combinations and exclusive of the clocking circuits the number of logic levels (3) in a minimal logic code converter is less than the number of digit positions in the smaller code group. This represents a fast response, low-cost converter.

While the invention has been particularly shown and described with reference to preferred embodiments thereof, it will be understood by those skilled in the art that various changes in form and details may be made therein without departing from the spirit and scope of the invention.

What is claimed is:

1. A permutation code to permutation code converter having input and output code group means each with a plurality of digit positions, each position having first and second signal states, a first one of said means having a smaller number of digit positions than a second one of said means, feedthrough means respectively between each digit position in said first means and different ones of said digit positions in said second means, the respective digit positions in said first and second means interconnected by said feedthrough means being corresponding digit positions with exchange of signals between said first and second means causing said corresponding digit positions to assume a like signal state, logic means receiving signals from a plurality of said digit positions in said input means and selectively supplying combinations of said input means digit positions to selected ones of said digit positions in said output means such that digit positions in said output means are selectively logically actuated to one of said signal states in accordance with the signal state of said input digit positions or by a predetermined logic relationship of the input means digit positions established by said logic means.

2. The converter set forth in claim 1 wherein said logic means comprises a small number of AND and OR circuits, said OR circuits receiving, respectively, signals from said AND circuits and said input means for selectively altering the signal state of selected digit positions in said output means, one of said digit positions in said output means being altered solely in a one-for-one relation to a given corresponding digit position in said input means.

3. The converter set forth in claim 2 wherein said input means is said first means and said output means is said second means, said logic means being responsive to signal-state combinations of said input means permutations of signal states to generate signals in said output means in addition to signal states supplied via said feedthrough means to run-length limit said output means signal permutations, said one digit position in said output means being positioned therein a number of digit positions from one end of the output means equal to said run-length limit and a corresponding one digit position in said input means being likewise disposed a like number of digit positions from an end of said input means.

4. The converter of claim 3, wherein digit positions between said one digit position in each of said means and one end thereof constitute sets of digit positions having unique relationships, signal state of said sets, respectively, being the identical ones actuating said logic means to be conditioned for creating actuating signals.

5. The converter set forth in claim 3, wherein said AND and OR circuits manipulate signals from said input means such that all binary 1 signals in said input means appear in said output means with additional binary 1 signals appearing in accordance with the logic of said AND circuits.

6. The converter set forth in claim 3 wherein a digit position of said output means other than any of said corresponding digit positions receives the complement output signal of a digit position in said input means in addition to signals from said logic means.

7. The converter set forth in claim 1, said first signal state representing binary 1 and said second signal state representing binary 0 wherein said input means is said second means with a greater number of digit positions than said output means, said logic means being arranged to subtract binary 1 signals from said second code signals as such signals are transferred to said output means.

8. The converter set forth in claim 1, wherein a set of digit positions in each of said input and output means constitute a code characteristic related set of digit positions, said logic means including an AND function combining all like signal states in the respective sets of digit positions to provide a group signal for generating in said logic means a plurality of signals in accordance with said characteristics for effecting code conversions between said input and output means, one of said code group means for handling code group of run-length characteristics, said sets each having a number of digit positions equal to said run-length limit.

9. The method of converting signals from a first permutation code group to a second permutation code group, one of said code groups having a greater number of digit positions than another of said code groups and having run-length-limited characteristics, a run-length limit being a limit of number of binary zero signals permitted in a row, selecting a signal from one digit position in said first group and supplying same as a signal in said second group, such that the digit positions in both of said groups have an end, the spacing from said end of said one digit position being equal to said run-length limit, generating other signals from said first code group in accordance with the signal states of digit positions of said first code group and logic OR'ing such signals with combinations of signals from said first group, said combinations being in accordance with run-length limit characteristics of said run length code group.

10. The method of claim 9, wherein a digit of said greater code group being the complement of another digit in said same group, and both of said digits receiving true and complement signals respectively from a digit position in the shorter one of said code groups, in addition to signals from said logic means.

11. A digital code converter, including the combination, input code means having a first number of digit positions, output code means having a second number of digit positions, first converter means for transferring a signal from one digit position in said input means to one digit position in said output means, second converter means for combining like signals from a given set of digit positions in said input means logically adjacent said one digit position and selectively combining a with signals from other digit positions of said input means to supply actuating signals to selectively alter signal states in all digit positions except said one digit position in said output means, and third converter means for logic OR'ing signals from selected ones of said input means digit positions with said actuating signals.

12. The converter set forth in claim 11 wherein one of said code means has five digit positions and another of said code means has four digit positions, said one digit positions being spaced from ends of said code means by two digit positions, said two digit positions in said input means being said given set, said second converter means comprising three AND functions, and said third converter means comprising a number of OR circuits equal to one less than the number of digit positions in said output code means.

13. A permutation code converter having means for receiving input signal code groups and means for supplying output signal code groups, said converter for converting signal permutations between a first code having a given number of signals in a code group and a second code having a greater number of signals in a code group, including the combination:

first means for selectively transferring said given number of signals from said input signal means without change, logic decode means responsive to permutations in said input signals to generate additional signals, and logic OR means combining said first means signals and said additional signals to generate said output signals.

* * * * *

PO-1050
(5/69)

UNITED STATES PATENT OFFICE
CERTIFICATE OF CORRECTION

Patent No. 3,624,637 Dated November 30, 1971

Inventor(s) John W. Irwin

It is certified that error appears in the above-identified patent and that said Letters Patent are hereby corrected as shown below:

Column 3, line 42, "=" (second occurrence) should read --+--.

Column 3, line 44, after "(2x1)", insert --+--.

Signed and sealed this 25th day of April 1972.

(SEAL)
Attest:

EDWARD M.FLETCHER,JR.
Attesting Officer

ROBERT GOTTSCHALK
Commissioner of Patents